July 7, 1931.  J. LAMBRECHT  1,813,858
TRAILER HITCH
Filed July 2, 1930
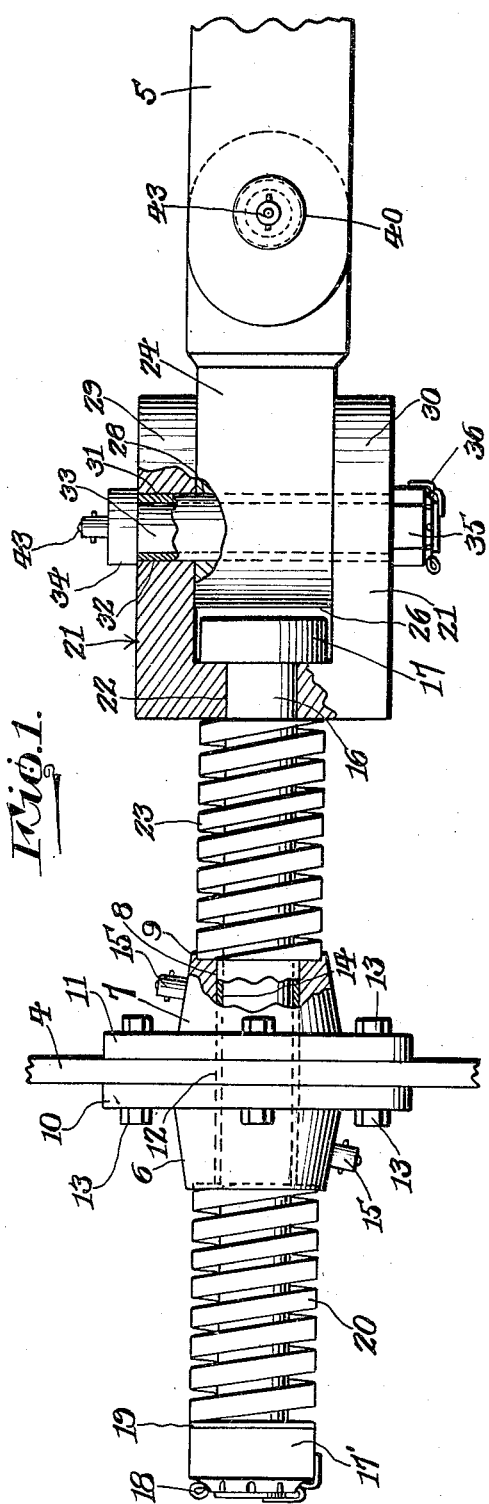
INVENTOR.
John Lambrecht
BY
Geo. P. Kimmel
ATTORNEY.

Patented July 7, 1931

1,813,858

UNITED STATES PATENT OFFICE

JOHN LAMBRECHT, OF ONEONTA, NEW YORK

TRAILER HITCH

Application filed July 2, 1930. Serial No. 465,410.

This invention relates to a trailer hitch, and has for its object to provide, in a manner as hereinafter set forth, a hitch of the class referred to so constructed and arranged for eliminating end play and shock between trailer and truck, as well as for doing away with side slap and further to provide a rigid coupling between the truck and trailer for general hauling uses.

A further object of the invention is to provide, in a manner as hereinafter set forth, a trailer hitch so constructed and arranged to reduce to a minimum the breaking of the frame of a truck caused by the trailer coming against the back of the truck or a rigid connection against the back of the truck.

A further object of the invention is to provide, in a manner as hereinafter set forth, a trailer hitch so constructed and arranged to set up a shock absorbing characteristic to take care of any jolt received by loose connections from heavily loaded trailer coming against the body of the truck or connection on account of sudden stoppage or application of brakes, or side sway of rigid connection between the trailer and truck by allowing the change of direction in a manner as hereinafter referred to, further to take up any of the motions of the road, roughness of the road, or turning from one road to another.

A further object of the invention is to provide, in a manner as hereinafter set forth, a trailer hitch so constructed and arranged as to provide for the starting of the trailer in movement of truck by a series of springs in conjunction with rolling joint which takes up starting strain on connection and also stopping strain first in getting trailer in motion and second bringing the trailer to a standstill after being in motion.

A further object of the invention is to provide, in a manner as hereinafter set forth, a trailer hitch so constructed and arranged for taking up the backward and forward movement of the trailer due to change of speed caused by travelling on rough roads.

A further object of the invention is to provide, in a manner as hereinafter set forth, a trailer hitch so constructed and arranged to permit of the disconnecting of the trailer from three spaced points of the hitch.

A further object of the invention is to provide, in a manner as hereinafter set forth, a trailer hitch so constructed and arranged as to include a rolling joint, a pitching joint, a turning joint, and means whereby the said joints can be expeditiously lubricated when desired.

Further objects of the invention are to provide, in a manner as hereinafter set forth, a spring controlled trailer hitch which is simple in its construction and arrangement, strong, durable, compact, thoroughly efficient in its use, conveniently installed and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a trailer hitch in accordance with this invention.

Figure 2 is a fragmentary view in side elevation of a trailer hitch in accordance with this invention.

Figure 3 is a fragmentary view in side elevation of a modified form.

Referring to Figures 1 and 2 of the drawings, 4 indicates the frame of the truck and 5 a pair of superposed straps or steel plates adapted to be bolted to the trailer tongue, not shown.

The hitch as shown in Figures 1 and 2 includes a pair of oppositely disposed supporting sleeves 6, 7, each having its outer diameter gradually decreasing from its inner toward its outer end and its inner face formed of two portions of different diameter, one portion being indicated at 8 and the other portion 9 and with the latter of greater diameter than the former and of less length than the length of the former. The portions 8, 9 of the inner face of each sleeve provide an internal shoulder in proximity to the outer end of each sleeve. The portion of the inner face of the largest diameter is arranged at the outer end of the sleeve and said outer end is the reduced end of the sleeve. Formed integral with the inner ends of the sleeves 6, 7 are laterally extending, annular flanges 10, 11 respectively. The flange 10 is arranged against the inner face of the frame 4 and the flange 11 against the outer face of the frame 4, the latter being formed with an opening 12 which aligns with the portions of largest diameter of the inner faces of the sleeves 6, 7. The flanges 10, 11 are secured against the frame 4 by the holdfast devices 13.

Positioned within and common to the sleeves 6, 7 extending through the opening 4, having its ends terminating at the outer ends of the portions of smallest inner diameter and flush with the internal shoulders of the sleeves 6, 7 is a bushing 14. The sleeves 6, 7 are provided with means, as indicated at 15 for the purpose of supplying lubricant thereto.

Extending through the bushing 14 and projecting from the smaller end of the sleeve 6 and the smaller end of the sleeve 7 is a draw bolt or bar 16 provided at its rear end with a head 17. Carried by the forward end of the bolt 16 is an abutment nut 17' retained in position by a cotter 18 which extends through the forward end of the bolt 16 and is bent to engage or rather overlap the forward edge of the bolt 16 and the side of the nut 17'. Positioned against that face of the nut 17' which opposes the reduced end of the sleeve 6 is a washer 19. Surrounding the bolt 16 and interposed between the washer 19 and the forward end of the bushing 4 is a coiled cushioning spring 20 which extends into the largest portion of inner diameter of the sleeve 6 and bears against the internal shoulder of the latter.

Revolubly mounted upon the rear end of the shank of bolt 16 and retained thereon by the head 17 is the forward end of a clevis 21 provided with an opening 22 for the passage of the shank of the bolt. The head 17 of the bolt 16 is positioned within the clevis 21. Surrounding the bolt 16 and interposed between the forward end of the clevis 21 and the internal shoulder of the sleeve 7 is a coiled cushioning spring 23, which extends into that portion of largest diameter of the inner face of the sleeve 7 and abuts the rear end of bushing 16.

Extending into the clevis 21, as well as projecting therefrom, is a coupling member formed of a pair of oppositely extending heads 24, 25, the former provided with a rounded free end 26, and the latter with a rounded free end 27. The head 24 extends into the clevis 21 and has its rounded free end 26 spaced from the head 17 of the bolt. The head 24 is formed with a transversely extending opening 28. The head 25 extends between the straps or plates 5 and is formed with a vertically disposed opening 28'. The clevis 21 is of the yoke shape and the arms thereof are indicated at 29, 30, each of which is provided with an opening 31. The openings 31 in the arms of the clevis 21 register with the openings 28 formed in the head 24. Mounted in the openings 28 and 31 is a bushing 32 which has its ends flush with the outer side faces of the arms 29, 30.

The head 24 is connected to the clevis 21 by a pivot bolt 33 having its head indicated at 34 and which bears against the outer side face of the arm 29 of the clevis. The bolt 33 projects from the arm 30 of the clevis 21 and carries a securing nut 35. A cotter pin 36 is employed to prevent the rotation of the nut 35 relative to the bolt 33 and the cotter pin 36 extends through the bolt 33 and is bent to overlap the latter and the nut 35. The head 24 projects a substantial distance from the free ends of the arms 29, 31 of the clevis 21.

The straps or plates 5 are formed with openings 37 which align and also register with the opening 28' formed in the head 25. Extending through the openings 37 and 28' is a bushing 38. The head 25 is connected to the straps 5 by a pivot bolt 39 having its head indicated at 40 and which seats against one of the straps or plates 5. The bolt 39 carries a securing nut 41 which bears against the other strap or plate 5. A cotter pin 42 is employed to prevent the rotation of the bolt 39 relative to the nut 41 and said cotter pin extends through bolt 39 and is bent to overlap the latter and the nut 41. The bolts 33 and 39 are provided with suitable means, as indicated as 43 for supplying lubricant.

The modified form shown in Figure 3 relates solely to the coupling member which is pivotally connected to the clevis 21 and in Figure 3 the coupling member includes a head 44 and a yoke 45. The head 44 is connected to the clevis 21 in the same manner as the head 24 of the coupling member shown in Figures 1 and 2. In lieu of employing a pair of straps or plates 5 for connecting the hitch to the trailer tongue, a single plate 46 is used and which is extended into the yoke 45 and pivotally connected therewith. The yoke 45 includes aligning openings 47 and which register with an opening 48 formed in the plate 46. A bushing 49 is mounted in the openings 47 and 48, and extending through the bushing is a headed pivot pin 50 which carries a securing nut 51 and a cotter 53 to prevent the nut 51 from rotating relative to the pin 50. A means for supplying lubricant to the bolt 50 is indicated at 53.

The bolt 16 in connection with the sleeves 6, 7, bushing 14 and the elements carrried by bolt 16 provide what is termed a rolling joint. The clevis 21 in connection with the head 24 and pivot bolt 33 provides what is termed a pitching joint and the straps or plates 5, head 25, and pivot bolt 39 provides for what is termed a turning joint. The turning joint is provided by the plate 46, yoke 45 and pivot bolt 50.

It is thought the many advantages of a trailer hitch, in accordance with this invention can be readily understood, and although the preferred embodiment of the invention is as illustrated and described, yet it is to be understood that changes in the details of construction can be had which fall within the scope of the invention as claimed.

What I claim is:—

1. In a trailer hitch, a rolling joint structure for connection to and extension through the rear of a truck frame and including a bushing, a headed pull bar extending through the bushing and resilient cushioning elements abutting the ends of the bushing and confined on the pull bar, a pitching joint structure including a clevis revolubly attached to the pull bar and a coupling member including a head pivoted to the clevis, the pivot for said head being disposed at right angles to the longitudinal axis of the bolt, said clevis abutting one of said resilient elements, and a turning joint structure including means pivotally connected to the coupling member and adapted to be secured to a trailer tongue, the pivot for the pitching joint being disposed at right angles to the pivot of the turning joint and at right angles to the longitudinal axis of the bolt.

2. In a trailer hitch, a pair of oppositely extending supporting sleeves each provided with an annular flange at one end thereof, means for securing said flanges to and on opposite sides of the rear of a truck frame, a bushing positioned in said sleeves and extending through the rear of said truck frame, a headed pull bar extending through said bushing and carrying an abutment nut at that end opposite the end provided with the head of the bar, a clevis revolubly mounted on said bar and having the head of the latter arranged therein, a resilient cushioning element mounted on the bar and interposed between the clevis and one end of said bushing, a resilient cushioning element mounted on the bar and interposed between said abutment nut and the other end of said bushing, a coupling member positioned within and extending from said clevis, means for pivotally connecting the coupling member to the clevis and disposed at right angles to said bar, a pivot extending through that portion of the coupling member projecting from the clevis, and means adapted to be secured to a trailer tongue, said means connected to the coupling member by the pivot in that portion of the coupling member extended from the clevis, the pivot for connecting the coupling member to the clevis extending at right angles to the pivot connecting said means to the coupling member.

3. In a trailer hitch, a pair of oppositely extending supporting sleeves each provided with an annular flange at one end thereof, means for securing said flanges to and on opposite sides of the rear of a truck frame, a bushing positioned in said sleeves and extending through the rear of said truck frame, a headed pull bar extending through said bushing and carrying an abutment nut at that end opposite the end provided with the head of the bar, a clevis revolubly mounted on said bar and having the head of the latter arranged therein, a resilient cushioning element mounted on the bar and interposed between the clevis and one end of said bushing, a resilient cushioning element mounted on the bar and interposed between said abutment nut and the other end of the bushing, a coupling member positioned within and extending from said clevis, means for pivotally connecting the coupling member to the clevis and disposed at right angles to said bar, a pivot extending through that portion of the coupling member projecting from the clevis, means adapted to be secured to a trailer tongue, said means connected to the coupling member by the pivot in that portion of the coupling member extended from the clevis, the pivot for connecting the coupling member to the clevis extending at right angles to the pivot for connecting said means to the coupling member, a bushing surrounding the pivot for connecting the coupling member to the clevis, and a bushing surrounding the pivot for connecting said means to the coupling member.

4. In a trailer hitch, a pair of oppositely extending supporting sleeves each provided with an annular flange at one end thereof, means for securing said flanges to and on opposite sides of the rear of a truck frame, a bushing positioned in said sleeves and extending through the rear of said truck frame, a headed pull bar extending through said bushing and carrying an abutment nut at that end opposite the end provided with the head of the bar, a clevis revolubly mounted on said bar and having the head of the latter arranged therein, a resilient cushioning element mounted on the bar and interposed between the clevis and one end of said bushing, a resilient cushioning element mounted on the bar and interposed between said abutment nut and the other end of said bushing, a coupling member positioned within and extending from said clevis, means for pivotally connecting the coupling member to the clevis and disposed at right angles to said bar, a pivot extending through that portion of the coupling member projecting from the clevis, and means adapted to be secured to a trailer tongue, said means connected to the coupling member by the pivot in that portion of the coupling member extended from the clevis, the pivot for connecting the coupling member to the clevis extending at right angles to the pivot connecting said means to the coupling member, the bushing in said sleeves having its ends terminating adjacent the non-flanged ends of said sleeves, said resilient cushioning elements extending into the non-flanged ends of said sleeves.

5. In a trailer hitch, a pair of oppositely extending supporting sleeves each provided with an annular flange at one end thereof, means for securing said flanges to and on opposite sides of the rear of a truck frame, a bushing positioned in said sleeves and extending through the rear of said truck frame, a headed pull bar extending through said bushing and carrying an abutment nut at that end opposite the end provided with the head of the bar, a clevis revolubly mounted on said bar and having the head of the latter arranged therein, a resilient cushioning element mounted on the bar and interposed between the clevis and one end of said bushing, a resilient cushioning element mounted on the bar and interposed between said abutment nut and the other end of said bushing, a coupling member positioned within and extending from said clevis, means for pivotally connecting the coupling member to the clevis and disposed at right angles to said bar, a pivot extending through that portion of the coupling member projecting from the clevis, means adapted to be secured to a trailer tongue, said means connected to the coupling member by the pivot in that portion of the coupling member extended from the clevis, the pivot for connecting the coupling member to the clevis extending at right angles to the pivot connecting said means to the coupling member, the bushing in said sleeves having its ends terminating adjacent the non-flanged ends of said sleeves, said resilient cushioning elements extending into the non-flanged ends of said sleeves, and means carried by said sleeves and pivots for supplying lubricant to said bushings.

6. A trailer hitch comprising a pair of oppositely extending, spaced, endwise opposed supporting sleeves having the opposed ends thereof provided with annular flanges adapted to be positioned against opposite sides of the rear of a truck frame, holdfast devices for securing said flanges to the rear of said frame, each of said sleeves having its inner face formed of two different diameters to provide an internal shoulder in proximity in the non-flanged end of the sleeve, the length of the portion of smallest inner diameter of each sleeve being greater than the length of the portion of largest diameter of the sleeve, a bushing mounted in said sleeves and having its ends flush with the outer ends of the portions of smallest inner diameter of said sleeves and registering with said internal shoulder, a headed pull bar extending through said bushing and projecting rearwardly and forwardly of the ends thereof, the head of said pull bar being arranged at the rear end of the latter, an abutment nut secured to said pull bar at the forward end of the latter, a clevis revolubly mounted on the pull bar and enclosing the head of the latter, a pair of spaced resilient cushioning elements mounted on the pull bar, one of said elements extending against one end of said bushing and the internal shoulder of one of said sleeves and abutting said clevis and the other end of the bushing and the internal shoulder of the other of said elements extending into the other of said sleeves and abutting said nut, a coupling member extending into and projecting rearwardly from said clevis, means for pivotally connecting the coupling member to the clevis, means adapted to be secured to a trailer tongue, and a pivot for connecting said means to the coupling member, said pivots disposed at right angles with respect to each other and to said rod.

7. A trailer hitch comprising a pair of oppositely extending, spaced, endwise opposed supporting sleeves having the opposed ends thereof provided with annular flanges adapted to be positioned against the opposite sides of the rear of a truck frame, holdfast devices for securing said flanges to the rear of said frame, each of said sleeves having its inner face formed of two different diameters to provide an internal shoulder in proximity to the non-flanged end of the latter, the length of the portion of smallest inner diameter of each sleeve being greater than the length of the portion of largest diameter of the sleeve, a bushing mounted in said sleeves and having its ends flush with the outer ends of the portions of smallest inner diameter of said sleeves and registering with said internal shoulders, a headed pull bar extending through said bushing and projecting rearwardly and forwardly of the ends thereof, the head of said pull bar being arranged at the rear end of the latter, an abutment nut secured to said pull bar at the forward end of the latter, a clevis revolubly mounted on the pull bar and enclosing the head of the latter, a pair of spaced resilient cushioning elements mounted on the pull bar, one of said elements extending against one end of said bushing and the internal shoulder of one of said sleeves and abutting said clevis and the other end of the bushing and internal shoulder of the other of said elements extending into the other of said sleeves and abutting said nut, a coupling member extending into and projecting rearwardly from said clevis, means for pivotally connecting the coupling member to the clevis, means adapted to be secured to a trailer tongue, a pivot for connecting said means to the coupling member, said pivots disposed at right angles with respect to each other and to said rod, bushings encompassing said pivots, means carried by said pivots, and means carried by the sleeves and said pivots for supplying lubricant to said bushings.

In testimony whereof, I affix my signature hereto.

JOHN LAMBRECHT.